United States Patent [19]

Valyi

[11] Patent Number: 5,702,665
[45] Date of Patent: Dec. 30, 1997

[54] PROCESS FOR HEAT TREATING THERMOPLASTIC CONTAINERS

[76] Inventor: Emery I. Valyi, 102 Moseman Ave., Katonah, N.Y. 10539

[21] Appl. No.: 381,708

[22] Filed: Jan. 31, 1995

[51] Int. Cl.⁶ .................................................. B29C 49/16
[52] U.S. Cl. .......................... 264/521; 264/530; 264/906
[58] Field of Search .................................. 264/521, 530, 264/906, 909

[56] References Cited

U.S. PATENT DOCUMENTS

| 4,522,779 | 6/1985 | Jabarin. | |
|---|---|---|---|
| 4,839,127 | 6/1989 | Ajera et al.. | |
| 4,853,171 | 8/1989 | Ajmera. | |
| 4,882,119 | 11/1989 | Ajmera. | |
| 4,891,178 | 1/1990 | Ajmera et al.. | |
| 5,085,822 | 2/1992 | Uehara et al.. | |
| 5,178,816 | 1/1993 | Suzuki et al.. | |
| 5,198,176 | 3/1993 | Fortin | 264/909 |
| 5,248,533 | 9/1993 | Sugiura et al. | 264/906 |
| 5,281,387 | 1/1994 | Collette et al. | 264/530 |
| 5,352,402 | 10/1994 | Orimoto et al. | 264/530 |
| 5,389,332 | 2/1995 | Amari et al. | 264/530 |
| 5,419,866 | 5/1995 | Valyi | 264/521 |

FOREIGN PATENT DOCUMENTS 6486290  7/1993  Australia.

Primary Examiner—Catherine Timm
Attorney, Agent, or Firm—Bachman & LaPointe, P.C.

[57] ABSTRACT

A process for preparing a thermoplastic container including the steps of providing a biaxially oriented, crystallized precontainer having a first contained volume, and further crystallizing the precontainer by applying heat thereto while the precontainer is substantially unconstrained, and forming a deformed precontainer having a second contained volume. Deformation of the precontainer is controlled by controllably closing the precontainer prior to further crystallizing and while the precontainer remains substantially unconstrained to create a predetermined increased air pressure therein, and reshaping the deformed precontainer into a final container shape.

9 Claims, 2 Drawing Sheets

PROCESS FOR HEAT TREATING THERMOPLASTIC CONTAINERS

BACKGROUND OF THE INVENTION

This invention relates to crystallization of orientable thermoplastics, and more particularly, to a crystallizing process using selectively directed heat which also preserves orientation.

Many of the properties of crystallized thermoplastics, for example, polyethylene terephthalate (PET), including resistance to gas permeation, improve as the material is oriented and/or crystallized. Crystallization may be induced by mechanical working, such as through molecular orientation, and thermally, such as by providing the heat necessary for the phase transformation of the material. Preferably, the two crystallizing processes are used to supplement each other.

In practice, two methods for crystallizing thermoplastics such as PET are primarily used. These methods are illustrated by U.S. Pat. Nos. 4,233,022 and 5,229,042. The method according to the '022 patent employs a blow mold heated to the crystallizing temperature of the material. The container is stretch blown from a preform to orient it and then thermally crystallized through contact with the heated mold. In the method according to the '042 patent, an oriented precontainer is produced in a conventional stretch blow mold. The precontainer is larger than the final container. The precontainer is then heated without constraint, at which time the precontainer shrinks due to thermal crystallization. Also, the molecular orientation in the precontainer due to its transformation from a preform is substantially reduced if not altogether eliminated. The shrunken precontainer is then formed into the desired shape of the final container by severely deforming its crystallized structure. Of the two methods, the latter provides faster operating cycles and is thus the more productive. However, the properties of the crystallized, finished container are inferior to those of the former, because the method described in the '022 patent superimposed thermal crystallization upon crystallinity due to orientation, while in the method according to the '042 patent the thermal crystallizing step causes the orientation induced crystallinity to be largely eliminated. It is well known that orientation induced crystallization is essential for improved resistance to gas transmission, e.g., shown in a paper by M. Salame presented at the BevPak Conference on Mar. 3, 1992, entitled "The Individual Contributions of Crystallinity and Orientation". By contrast, when the shrunken precontainer in the '022 patent is reformed, the attendant deformation of the lamellar structure appears to be severe and therefore damaging. For a discussion of crystalline structures and morphologies, see Ward, "Structure and Properties of Oriented Polymers", published by John Wiley, and numerous subsequent publications.

It is evident from that literature that orientation induced crystallinity is more efficacious for gas retention than heat induced crystallinity because of the different morphologies that result from the two processes. That is, orientation induced crystallinity provides nucleation sites from which typical spherulitic crystal regions propagate in a lamellar array. Since many such sites are created, the resulting crystallites are small and finely dispersed. Heat induced orientation provides spherulites as well, but these spherulites grow randomly and develop a larger size than those formed in the orientation induced process.

In comparing the two above processes, the '022 patent induces a substantially higher amount of crystallinity due to orientation wherein the properties of the material are improved to a much greater extent, while in the '042 type process most of the orientation is lost, even while in the '042 type processes, the substantially unoriented, highly crystallized precontainer is reblown, i.e., vigorously deformed from its shrunken condition. As is well known, the crystallized structure is substantially brittler than the amorphous one at the temperature at which reblowing must take place. In consequence, the crystalline regions appear to develop discontinuities in the course of reblowing that are large enough to permit increased migration of gas molecules whenever the size of the latter is smaller than the said discontinuities. This results in diminished gas barrier properties of the product.

Accordingly, the results from the '022 patent type processes, as compared with the '042 patent type processes, are vastly superior in terms of gas permeation resistance. The properties resulting from the '022 patent type processes result from orientation induced crystallinity, which can be enhanced thermally without the structure or material having been subjected to major deformation after thermal crystallizing. However, while the '022 patent type process is the superior in terms of performance of the materials processed, it is more costly than the '042 patent procedures because the application of heat in the '022 patent processes, via the mold, is much less efficient than in the '042 patent processes wherein radiant heaters are typically used. The molding cycle of the '022 patent may be as much as four times slower than the reblow-molding cycle in the process according to the '042 patent.

U.S. Pat. Nos. 5,178,816 and 5,352,402 describe a modification of the process according to the '042 patent wherein the precontainer is controllably pressurized during the heating thereof to influence the shrinkage of the precontainer. In addition, a rod may be used during heating to align said precontainer and to keep it centered during said heating.

U.S. patent application Ser. No. 08/032,636, By Emery I. Valyi, filed Mar. 17, 1993, now U.S. Pat. No. 5,419,866, discloses a modification of the process according to the '042 patent wherein the precontainer is substantially unconstrained during heating, be it by a mold, an alignment rod, or closure of its open end, and wherein heating is carried out according to the degree of orientation of said precontainer, resulting in substantial shrinkage.

There exists, therefore, a need in the thermoplastic container art for a process for crystallizing a thermoplastic container, wherein the process controls shrinkage of the precontainer so as to avoid excessive deformation thereof upon reforming while not requiring constraining molds during heat treatment, obtained by substantially suppressing change in the enclosed volume of the precontainer during heat treatment.

SUMMARY OF THE INVENTION

The primary object of this invention is to provide a process for crystallizing thermoplastics which is at least as efficient as thermal processes while achieving properties associated with orientation type processes.

Another object of this invention is to provide a process for crystallizing thermoplastics which is cost efficient in having relatively few complex parts.

Still another object of this invention is to provide a process for crystallizing thermoplastic containers which forms containers having high resistance to gas permeation.

Yet another object of this invention is to provide a process for crystallizing thermoplastic containers using heat treatment, wherein during heat treatment shrinkage is controlled in order to minimize deformation of the crystallized prebottle when re-shaping in the course of reblowing. For the purpose of clarification, the term "deformation" means a substantial change of the density of a substance being worked, while "shaping" denotes a change in geometry. As an example, a slab is "deformed" in rolling it into a sheet, but bending that sheet is "shaping"

Still another object of this invention is to provide a process for crystallizing thermoplastic containers, wherein the process uses internal pressure generated by the air contained within the precontainer for substantially preventing container shrinkage during heat treatment.

A process for preparing a thermoplastic container in accordance with the instant invention and which meets the forementioned objects comprises providing a biaxially oriented and thereby highly crystallized precontainer with crystallinity preferably over 30% and having a first contained volume, and further crystallizing the precontainer by applying heat thereto while the precontainer is substantially unconstrained and forming a deformed precontainer having a second contained volume. During the step of thermal crystallizing, the temperature of the air in the precontainer is increased resulting in the pressure that controls the shrinkage of the precontainer.

Deformation of the precontainer is controlled by controllably closing the precontainer prior to thermal crystallizing and while the precontainer remains substantially unconstrained to create a predetermined increased air pressure therein. The deformed precontainer is then shaped into the finished container, wherein the increased air pressure in the precontainer is controlled so as to minimize stresses during molding of the final container.

The increased air pressure limits the amount of deformation of the precontainer and permits only symmetrical shrinking.

In a preferred procedure, the precontainer is rotated during the step of thermally crystallizing to achieve substantially even heat distribution.

In the preferred embodiment, the precontainer is selectively crystallized and the deformed precontainer shaped by pressurizing the selectively crystallized, deformed precontainer in a reforming means. The reforming means is preferably a blow mold, and the process further includes the step of pressurizing the crystallized, deformed precontainer to conform it to the configuration of the blow mold.

In the preferred embodiment, the precontainer is closed by means of a pressure relief valve comprising control means for the pressure retained in the precontainer.

The details of the present invention are set out in the following description and drawings wherein like reference characters depict like elements.

BRIEF DESCRIPTION OF THE DRAWINGS

The present invention will be more readily understandable from a consideration of the following illustrative examples, wherein.

DETAILED DESCRIPTION OF THE PREFERRED EMBODIMENTS

While the present invention preferably applies to polyethylene terephthalate (PET), other crystallizable thermoplastic materials are readily contemplated herein, such as polycarbonates and polyolefins.

Figure 1:
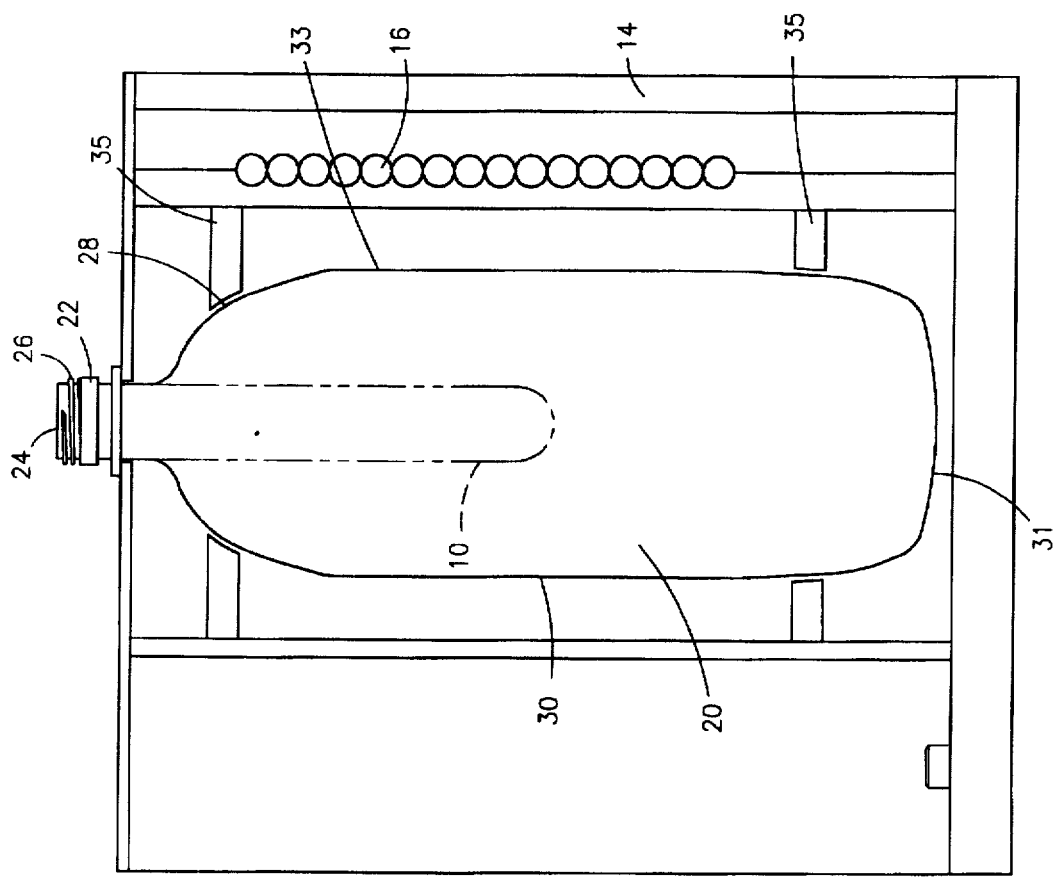
FIG. 1 is an elevation of a hollow plastic precontainer located in a heating device for heat-treatment, including the parison or preform from which it is prepared shown in phantom.

FIG. 1 shows a representative precontainer 20, a bottle, that has been made by stretch-blowing a preform 10 shown in dotted lines, by conventional blow molding under conditions inducing bi-axial orientation and a corresponding amount of crystallinity. Since deformation, i.e., stress-induced crystallinity is the greater the more the preform is deformed, said preform is designed for the maximum stretch and blow-up ratios tolerated by the given material.

Figure 2:
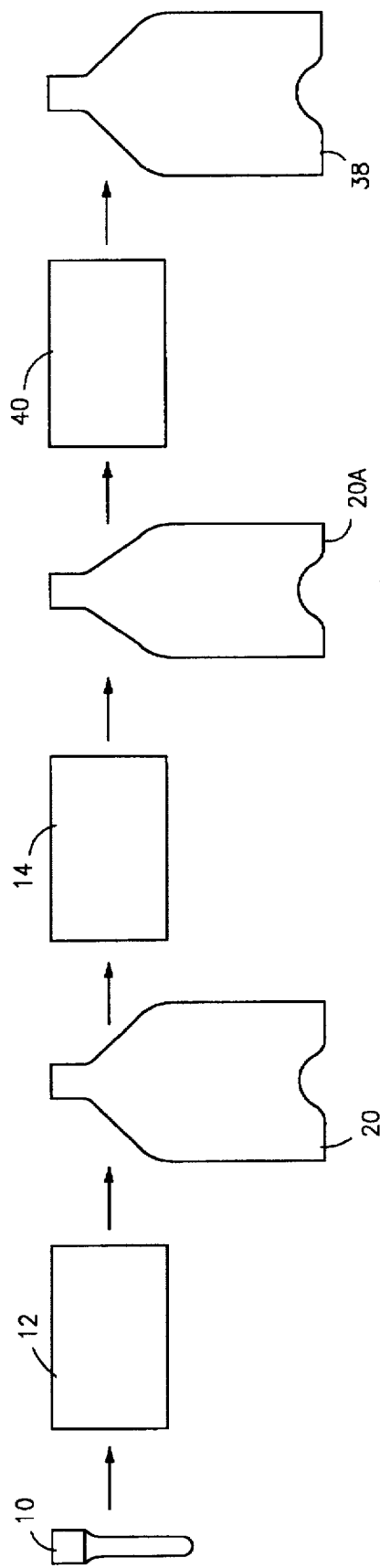
FIG. 2 is a flow diagram showing the process in accordance with the principles of the present invention.

Precontainer 20 has a neck portion 22 defining an opening 24 and including external threads 26. Shoulder portion 28 depends from the neck portion, precontainer side wall or body portion 30 depends from the shoulder portion and precontainer bottom 31 depends from the precontainer body portion, as shown in FIG. 1. Body portion 30 has an outer wall 33. Precontainer 20 of FIG. 1 was previously and independently molded by inserting heated preform 10, such as the preform shown in dotted lines in FIG. 1, into a blow mold 12, stretched axially to extend its length while air pressure was applied to expand the preform into the shape of blow mold 12 and to cool it therein, all as known in the art, as shown in FIG. 2. It can be readily seen from FIG. 1 that the several parts of the preform that are deformed, are deformed to different extents as they are stretch blown into the shape of the precontainer, and that the latter will contain corresponding distributions of crystallinity and residual stress. FIG. 1 also shows a sectional view of a heating device 14 wherein precontainer 20 is to be directed. Any heating device can be used that desirably has means for selectively heating portions of the container depending on the molecular orientation of the particular portion, particularly via radiant or convective heating. The selective heating is preferably variable in terms of the temperature at which the portions are heated. One example of a heating device for achieving the process described herein is disclosed in U.S. patent application Ser. No. 08/032,636 by Emery I. Valyi now U.S. Pat. No. 5,419,866.

Heat treatment is preferably effected by radiant heaters 16, such as those shown in FIG. 1 and in the above designated application. Preferably, the amount of radiant heat from each heater may be individually controlled by known means (not shown), e.g., potentiometers. In place of radiant heaters 16, a line of nozzles may be arranged instead of each radiant heater, not shown, each set of said nozzles communicating with a manifold to conduct heated fluid therethrough, to impinge on corresponding parts of precontainer 20, whereby the temperature of the fluid emanating from each manifold is individually adjustable.

In order to protect selected portion(s) from being heated, the same may be shielded from the heating environment of whatever heating device is used, as shown by baffles 35 in FIG. 1, or other shielding. The portions which may be protected are the ones in which opacity would result due to heating. Typically, these are the portions that have been deformed less than approximately 2-fold in the course of expanding the preform into the precontainer shape, as above. The degree of orientation in shoulder portion 28 increases from neck portion 22 downward, with increasing dimensions of the shoulder. In order to crystallize shoulder portion 28 to the greatest extent possible without inducing opacity, heaters 16 that are preferably juxtaposed the shoulder are regulated by adjustment of heat intensity or the distance from the shoulder.

Figure 4:
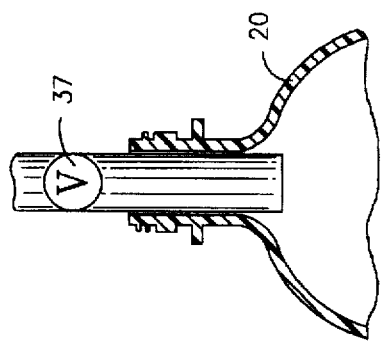
FIG. 4 is a schematic partial sectional view showing a pressure relief valve for controlling the pressure in the precontainer.

PET exhibits shrinkage upon thermal crystallization depending on the degree of crystallization that is obtained, since density of the crystalline and amorphous phases differs by approximately 9%. In order to avoid a large degree of the shrinkage which typically occurs during crystallization of the PET containers via the radiant heating, opening 24 of neck portion 22 is controllably closed, and then heated by the radiant heaters with the precontainer being substantially unconfined. Thereby, the air within the precontainer is also heated, with concomitant increase of air pressure. Precontainer 20 is closed so as to control the rising pressure by the escape of air from the precontainer. A particularly advantageous embodiment is shown in FIG. 4 wherein precontainer 20 is closed by means of pressure relief valve 37 comprising control means permitting air escape from the precontainer to limit the amount of air pressure in precontainer 20.

During the heating of precontainer 20 via radiant heaters 16 or the like, as shown schematically in heating device 14 of FIG. 2, the air pressure within the precontainer is caused to rise as controlled by pressure relief valve 37 to push outwardly on all portions of precontainer 20, including shoulder portion 28, precontainer body portion 30 and bottom portion 31. Because of the air pressure within precontainer 20, shrinkage of the precontainer is significantly averted relative to existing processes.

Precontainer 20 will deform to a limited degree as its crystallinity increases, but mostly it will change its shape as shown in FIG. 2 as deformed precontainer 20A, but only to the extent permitted by the air pressure generated within. Such pressure is related to the volume of the bottle as it controllably deforms, in accordance with the gas law $pV=Rt$, where p is pressure, V is volume, R is a characteristic constant, and t is temperature. Accordingly, as temperature is increased and the volume decreases, pressure will rise to the point where any further shrinkage is forestalled.

To the extent that precontainer 20 does deform, it deforms symmetrically and the axis thereof does not shift as it usually does when heated in the absence of the internal pressure. No internal rod is needed to maintain the precontainer straight, which substantially simplifies the crystallizing process and crystallizing device used therefor.

Figure 3:
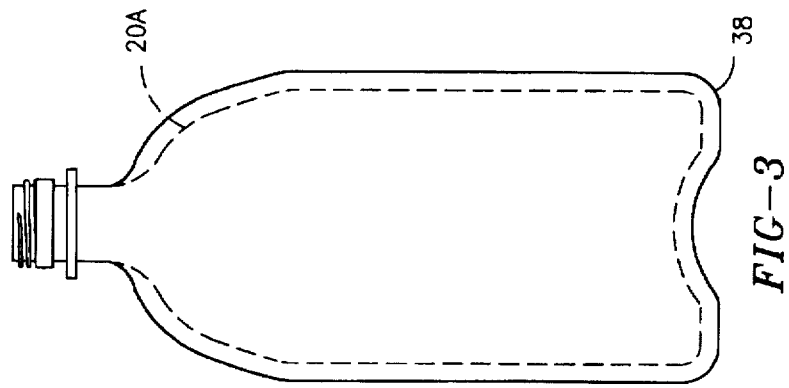
FIG. 3 is a diagrammatic view of the crystallized precontainer compared to a desirably sized container.

As shown in FIG. 3, the volume of deformed precontainer 20A (shown in dashed lines) is close enough in size to the desired size of final container 38 to require only reshaping the deformed precontainer to achieve the desired shape, rather than to deform the crystallized morphology which is thought to produce stress concentrations in and corresponding defects in the lamellar structure, as is the case with prior processes. Accordingly, opportunities for gas permeation are reduced to tolerable levels.

Upon completion of their traverse through heating device 14, precontainer 20A is rapidly transferred to reforming means or blow mold 40 shown schematically in FIG. 2. Blow mold 40 is in the shape of the desired final container 38 and upon movement of the crystallized precontainer therein, the said precontainer 20A is blown into the desired shape.

Accordingly, freshly heat treated precontainers 20A are quickly transferred to blow mold 40, while at a temperature suitable for reshaping and pressurized to conform them to the desired configuration. The mold and final container 38 are then cooled by conventional means, not shown. They are kept there until cold enough to maintain the dimensions and shape determined by the mold, at which time the specified contained volume of the bottle is fixed.

In accordance with the present invention, the process may be carried out continuously as aforesaid using the procedure shown in FIG. 2, or for example, as shown in U.S. patent application Ser. No. 08/032,636, now U.S. Pat. No. 5,419,866, or intermittently in separate steps, as for example in accordance with the apparatus and procedure shown in U.S. Pat. No. 5,206,039, by Emery I. Valyi.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for preparing a thermoplastic container, comprising the steps of:

providing a biaxially oriented, crystallized precontainer having a first contained volume by expanding said precontainer from a tubular preform;

selectively further crystallizing said precontainer by applying heat thereto while the precontainer is substantially unconstrained, including the step of protecting from heating those portions of the precontainer that have been deformed less than 2-fold in the course of expanding the preform to form said precontainer, and forming a deformed precontainer having a second contained volume;

controlling deformation of the precontainer by closing the precontainer prior to further crystallizing in a manner permitting the controllable air escape from the precontainer and while the precontainer remains substantially unconstrained to create a predetermined increased air pressure in the deformed precontainer;

reshaping the deformed precontainer by blow molding into a final container shape;

wherein the increased air pressure in the deformed precontainer is controlled so as to provide said second contained volume of the deformed precontainer to be sufficiently close to the volume of the final container such that during reshaping, stresses are minimized, and wherein the deformation of the precontainer is controlled so as to obtain a size and shape capable of being transformed into a predetermined final shape without further substantial deformation by changing the shape of said crystallized precontainer in a blow mold into that of said container; and wherein the increased air pressure limits the amount of deformation of the precontainer and permits only symmetrical shrinking; and wherein said precontainer has a level of orientation, and wherein said second contained volume being defined by a shape such as to substantially maintain the level of orientation of the precontainer.

2. The process according to claim 1, further comprising the step of rotating the precontainer during the step of crystallizing for achieving substantially even heat distribution.

3. The process according to claim 2, further comprising the step of moving the precontainer through a heating device with said precontainer being substantially unconfined during the moving.

4. The process according to claim 1, wherein the deformed precontainer is reshaped by pressurizing the deformed precontainer in a reforming means.

5. The process according to claim 4, wherein the reforming means is a blow mold, the process further including the step of pressurizing the deformed precontainer to conform it to the configuration of the blow mold.

6. The process according to claim 4, wherein said precontainer is reshaped within 5 seconds of leaving said crystallizing step.

7. The process according to claim 1, wherein the thermoplastic is polyethylene terephthalate.

8. The process according to claim 1, wherein the precontainer is closed by means of a pressure relief valve comprising control means for the pressure retained in the precontainer.

9. A process according to claim 1, wherein the precontainer includes a bottom portion, and including the step of protecting the bottom portion from heating during said further crystallizing step.

* * * * *